(12) United States Patent
Takahashi

(10) Patent No.: US 6,265,869 B1
(45) Date of Patent: Jul. 24, 2001

(54) METHOD OF DETECTING THERMAL ASPERITY OF MAGNETIC STORAGE DEVICE AND CIRCUIT THEREOF

(75) Inventor: Yasuhiko Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/206,472

(22) Filed: Dec. 7, 1998

(30) Foreign Application Priority Data

Jun. 18, 1998 (JP) .................................................. 10-171144

(51) Int. Cl.$^7$ .................................................. G01R 33/12
(52) U.S. Cl. .............................. 324/212; 360/46; 360/25
(58) Field of Search ..................................... 324/212, 210, 324/211; 360/46, 67, 75, 31, 25; 714/765, 769

(56) References Cited

U.S. PATENT DOCUMENTS 5,701,314 * 12/1997 Armstrong et al. .................. 714/765
5,715,110 * 2/1998 Nishiyama et al. .................... 360/67
5,822,139 * 10/1998 Ayabe ..................................... 360/31
5,898,532 * 4/1999 Du et al. ................................ 360/46

FOREIGN PATENT DOCUMENTS 4898760    12/1973 (JP) .

* cited by examiner

*Primary Examiner*—Christine Oda
*Assistant Examiner*—Subhash Zaveri
(74) *Attorney, Agent, or Firm*—Greer, Burns & Crain Ltd.

(57) ABSTRACT

Disclosed are a method of detecting a thermal asperity of a magnetic storage device which detects that a magnetic resistance element comes into contact with a magnetic storage medium, and a circuit thereof. This method comprises detecting an amplitude of an output of the magnetic resistance element, and creating a slice level that is m-times (m>1) as large as an output level. The slice level of an output relative value is created from the output of the magnetic resistance element, and hence the slice level having a magnitude corresponding to the output level of each magnetic resistance element can be automatically created. It is therefore feasible to accurately detect the thermal asperity of each magnetic resistance element.

16 Claims, 11 Drawing Sheets

METHOD OF DETECTING THERMAL ASPERITY OF MAGNETIC STORAGE DEVICE AND CIRCUIT THEREOF

BACKGROUND OF THE INVENTION

1. Field of the Invention

The present invention relates to a method of detecting a thermal asperity of a magnetic storage device for reading data from a magnetic storage medium by a magnetic resistance element and to a circuit thereof.

2. Description of the Related Art

In a magnetic disk device, a magnetic head reads and writes data from and to a rotating magnetic disk. This magnetic disk floats with rotations of the magnetic disk. For enabling a storage density of the magnetic disk device to increase, a magnetic resistance element is used as a reading element of the magnetic head.

The magnetic resistance element (MR element) is an element of which a resistance value changes corresponding to a magnitude of a magnetic field. This magnetic head reads, keeping the head itself afloat above the magnetic disk, the data from the magnetic disk. An enhancement of the storage density requires reducing a leakage of the magnetic field from the magnetic disk. It is therefore required that a floating quantity of the magnetic head be small, and this floating quantity is decreased down to several tens of microns.

On the other hand, the surface of the magnetic disk has ruggedness on the order of several microns to several tens of microns, and is not therefore perfectly flat. The magnetic head might come into contact with the rugged portion on the magnetic disk. The magnetic resistance element generates heat due to this contact. This contact heat might cause a change in resistance value of the magnetic resistance element, resulting in a change in baseline for a reading output. This is called a thermal asperity (TA) Therefore, the signal can not be normally read.

This being the case, the magnetic resistance element detects the contact with the magnetic disk, and there must be a necessity for taking some measure for the read signal, which involves a technology of detecting the thermal asperity.

FIG. 12 is a diagram showing a configuration of a prior art read circuit. FIG. 13 is a diagram showing a configuration of a prior art thermal asperity (TA) detecting circuit. FIG. 14 is a diagram showing a waveform in the prior art.

As illustrated in FIG. 12, magnetic heads 91-1, 91-2 read and write the data from and to a rotating magnetic disk 90. The two magnetic heads 91-1, 91-2 are provided for one magnetic disk 90. The magnetic heads 91-1, 91-2 has the magnetic resistance elements serving as the reading elements.

One read circuit 98 is provided for whole magnetic heads (the magnetic resistance elements) of the magnetic disk device. A switch 97 connects a selected magnetic head to one read circuit 98. A read amplifier 92 amplifies the read signals of the magnetic heads (the magnetic resistance elements) 91-1, 91-2.

A thermal asperity detecting circuit 93 detects a thermal asperity from read outputs of the magnetic heads 91-1, 91-2. A high-pass filter 94 cuts off low-frequency components of the read signals amplified by the read amplifier 92. An analog/digital converter 95 converts the read signal into a digital value. A read channel circuit 96 is constructed of a microprocessor. The read channel circuit 96 modulates the digital-valued read signals, and outputs the read data.

This conventional thermal asperity detecting circuit 93 is, as illustrated in FIG. 13, constructed of an electric potential source 100 for generating a slice level SL, and a comparing circuit 99 for comparing levels of the read signal of the magnetic heads (the magnetic resistance elements) 91-1, 91-2 with the slice level SL.

As shown in FIG. 14, a read output RS-1 of the magnetic resistance element when not in contact with the magnetic disk 90 is fixed in terms of a baseline. When the magnetic resistance element is brought into contact with the magnetic disk 90, however, the read output changes as indicated by RS-2 in FIG. 14. Namely, when the magnetic resistance element comes into contact with the magnetic disk 90, the baseline of the read output RS-2 of the magnetic resistance element abruptly rises due to the heat of the magnetic resistance element. Then, the baseline gradually returns to the previous value with a thermal decrease of the magnetic resistance element.

For detecting the thermal asperity indicating the output change described above, the read signal has hitherto been compared with the fixed slice level SL common to the respective heads. Then, if the read level exceeds the slice level SL, a thermal asperity detection signal TAF is generated.

The read channel circuit 96 is notified of this thermal asperity detection signal TAF, and executes a process of correcting the baseline of the read signal. For example, the read channel circuit 96, upon receiving the thermal asperity detection signal TAF, retries to read the data on the track concerned.

Then, the read channel circuit 96, when in the read-retry process, operates the high-pass filter 94 and cuts off the low-frequency component of the read signal RS-2. A frequency of change in the baseline is lower than a frequency of a data part of the read signal. Therefore, the read signal RS-2 is processed so that its low-frequency component of the segment with the changed baseline is cut off as indicated by a waveform RS-3 in FIG. 14. A time (a length) of the segment with the changed baseline is thereby reduced.

This segment with the changed baseline is small, and therefore, even if the data of this segment is judged to be abnormal, this can be saved by an error correction which will be executed at a posterior stage. Incidentally, the reason why the high-pass filter is operated only when detecting the thermal asperity is that the low-frequency component of the read signal is always cut off if the high-pass filter is operated at all times, and the signal level is lowered, resulting in causing more reading errors. The high-pass filter is operated only when the thermal asperity is detected, thereby making it feasible to restrain the descent of the signal level within a minimum range.

Thus, the slice level has hitherto been set based on the absolute value common to the respective heads.

There arise, however, the following problems inherent in the prior art.

First, the single read circuit 98 (the thermal asperity detecting circuit 93) is provided for the whole respective heads of the magnetic disk device. The output level of each of the magnetic heads (the magnetic resistance elements) differs corresponding to differences in terms of the resistance values of the magnetic resistance elements and of sense currents. The prior art has such a problem that the thermal asperity of each magnetic resistance element is unable to be accurately detected because of the common slice level being set with respect to the output level differing according to each magnetic resistance element.

Second, avoidance of this problem involves the use of a method of measuring the output level of each of the magnetic resistance elements and setting the slice level for detecting the thermal asperity of each individual magnetic resistance element. This method presents an inconvenience, wherein a characteristic of each of the magnetic resistance elements within the magnetic disk device is measured, and the slice level must be determined. A further inconvenience peculiar to this method is that a memory is stored with the slice levels of the respective magnetic resistance elements, and, when selecting the magnetic head (the magnetic resistance element), the slice level of the selected magnetic head (the magnetic resistance element) is required to be set in the thermal asperity detecting circuit. This conduces to such a problem that a measuring process is time-consuming due to the detection of the thermal asperity, and the control is needed when selecting the head.

SUMMARY OF THE INVENTION

It is a primary object of the present invention to provide a method of thermal asperity of a magnetic storage device and a circuit thereof, which serve to detect the thermal asperity on the basis of a slice level corresponding to a characteristic of each of magnetic resistance elements.

It is another object of the present invention to provide a method of detecting a thermal asperity of a magnetic storage device which detects the thermal asperity from a slice level corresponding to a characteristic of each magnetic resistance element, and to a circuit thereof.

It is a further object of the present invention to provide a method of detecting a thermal asperity of a magnetic storage device which detects the thermal asperity from a slice level corresponding to a characteristic of each magnetic resistance element without setting the slice level of each magnetic resistance element, and to a circuit thereof.

To accomplish the above objects, according to a first aspect of the present invention, a method of detecting a thermal asperity of a magnetic storage device comprises a first step of detecting an amplitude of an output of the magnetic resistance element, and creating a slice level which is m-times (m>1) as large as a level of the output, and a second step of comparing an output signal of the magnetic resistance element with the slice level, and generating a thermal asperity detection signal.

According to a second aspect of the present invention, a circuit for detecting a thermal asperity of a magnetic storage device comprises a slice level creating circuit for detecting an amplitude of an output of the magnetic resistance element, and creating a slice level which is m-times (m>1) as large as a level of the output, and a comparing circuit for comparing an output signal of the magnetic resistance element with the slice level, and generating a thermal asperity detection signal.

According to the present invention, the slice level is created from the output of the magnetic resistance element. To be more specific, the amplitude of the output of the magnetic resistance element is detected, and the slice level which is m-times (m>1) as large as the output level is creased. Thus, since the slice level of the output relative value is created from the output of the magnetic resistance element, the slice level having a magnitude corresponding to the output level of each magnetic resistance element can be automatically created.

Therefore, the slice level corresponding to the characteristic of each of the magnetic resistance elements can be automatically created, so that the thermal asperity of each magnetic resistance element can be precisely detected. Besides, the characteristic of each magnetic resistance element can be actualized without measuring it, and hence a labor for the measurement can be omitted. Moreover, the control of setting the slice level when selecting the head is not required, and therefore a burden on the firmware can be relieved. According to a third aspect of the present invention, the first step includes a step of multiplying the level of the output of said magnetic resistance element by "m" (m>1).

According to a fourth aspect of the present invention, the first step includes a step of cutting off a predetermined frequency component of the output of the magnetic resistance element.

According to a fifth aspect of the present invention, the cutting step comprises a step of cutting off a low frequency component of the output of the magnetic resistance element.

According to a sixth aspect of the present invention, the cutting step comprises a step of cutting off a high frequency component of the output of the magnetic resistance element.

According to a seventh aspect of the present invention, the first step includes a step of holding the output level of the magnetic resistance element in accordance with the thermal asperity detection signal.

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention, in which.

DETAILED DESCRIPTION OF THE PREFERRED EMBODIMENTS

Figure 1:
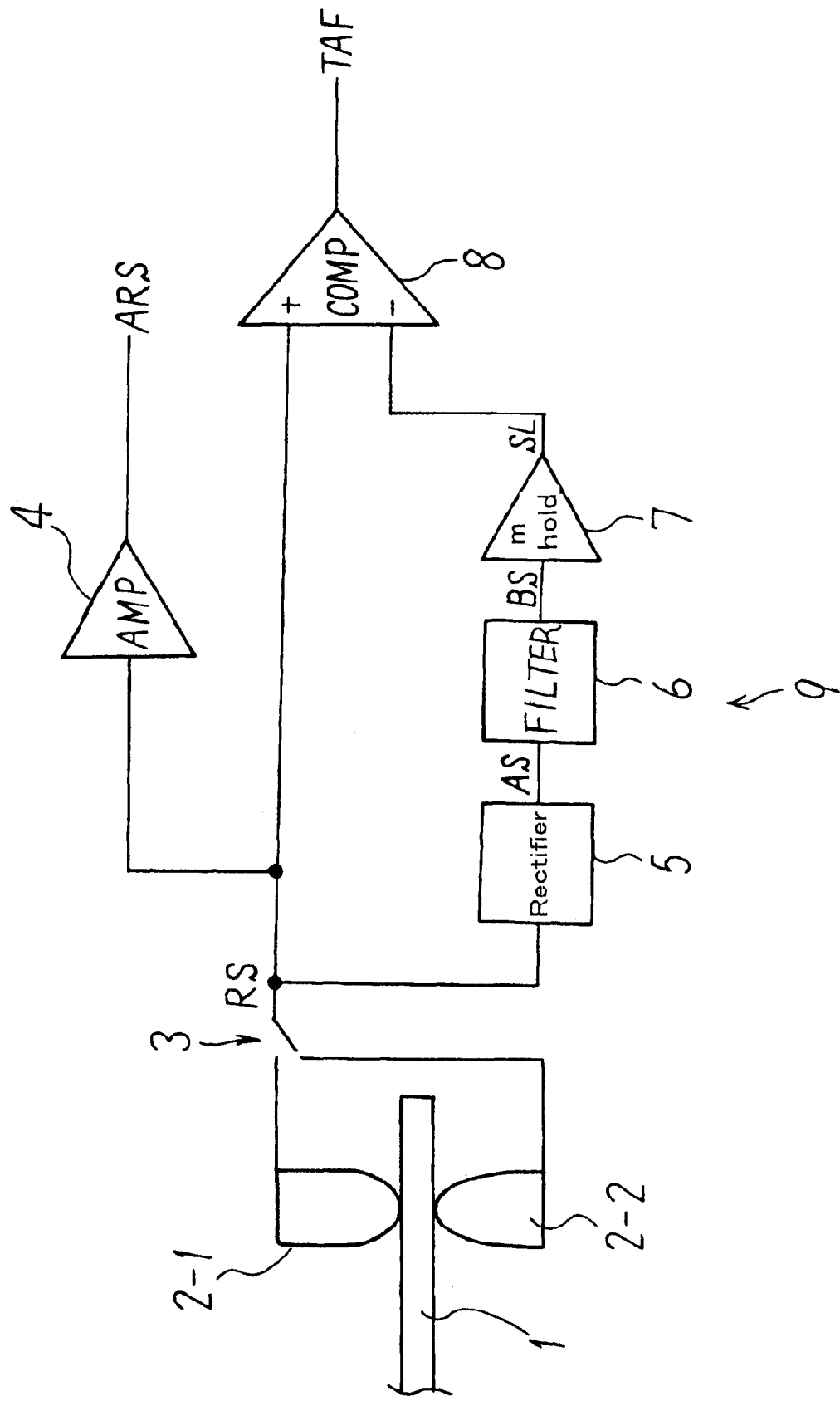
FIG. 1 is a diagram showing a circuit in a first embodiment of the present invention.
Figure 2:
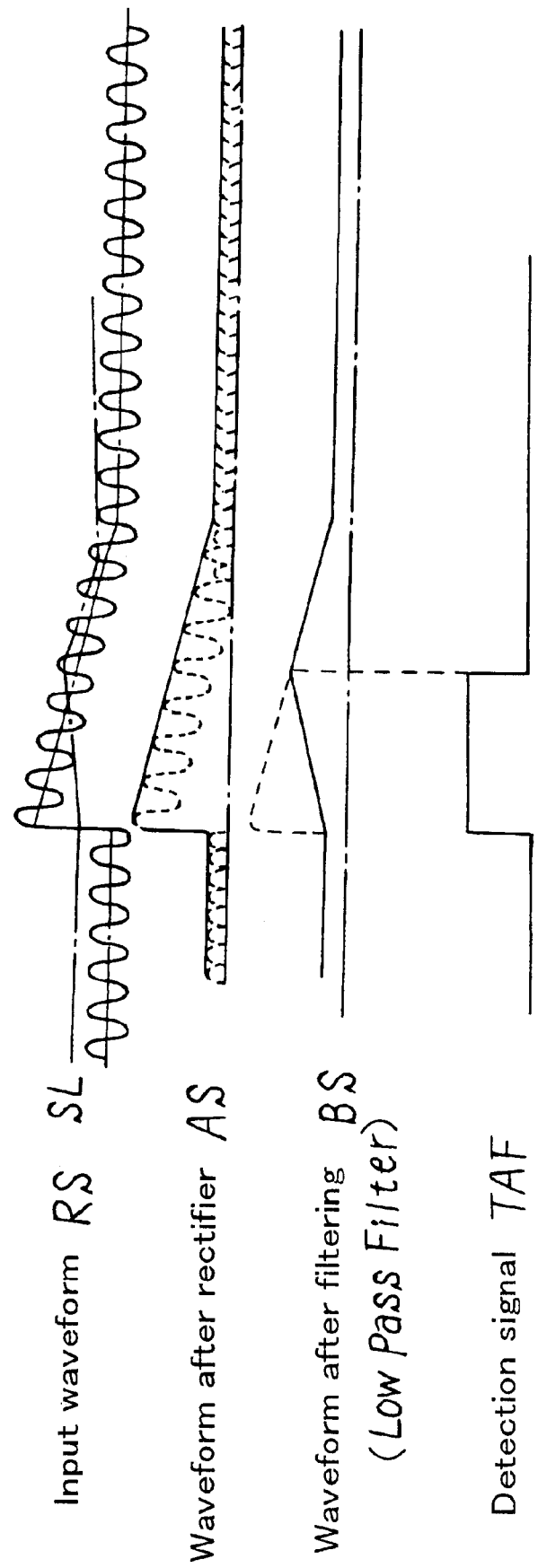
FIG. 2 is a diagram showing waveforms in the first embodiment of the present invention.

FIG. 1 is a diagram showing a circuit in a first embodiment of the present invention. FIG. 2 is a diagram showing waveforms based on a construction in FIG. 1.

As shown in FIG. 1, a magnetic disk 1 is rotated by an unillustrated spindle motor. A pair of magnetic heads 2-1, 2-2 are provided the surface and the undersurface of the magnetic disk 1. The magnetic heads 2-1, 2-2 have magnetic resistance elements serving as reading elements.

A switch 3 switches over the magnetic heads 2-1, 2-2. A read amplifier 4 amplifies read outputs of the magnetic heads (the magnetic resistance elements) 2-1, 2-2, and output the outputs to a high-pass filter 94 (see FIG. 12).

A thermal asperity detecting circuit 9 is constructed of an amplitude detecting circuit 5, a low-pass filter 6, an amplifier circuit 7 and a comparing circuit 8. The amplitude detecting circuit 5 detects an amplitude of a read signal RS, and is constructed of a rectifier. As shown in FIG. 2, an amplitude detection output AS indicates an envelope of the read signal (an input signal) RS.

The low-pass filter 6 cuts off a high-frequency component of a rectification output. This low-pass filter 6 generates a filter output BS (see FIG. 2) in which the high-frequency component produced immediately after a contact with the magnetic head is cut off. The amplifier circuit 7 multiplies a level of the filter output BS by "m" (m>1), thereby creating a slice level SL.

The comparing circuit 8 compares the input signal RS with the slice level SL, and, when the input signal RS exceeds the slice level SL, generates a thermal asperity detection signal TAF.

An operation of this comparing circuit 8 is explained. An amplitude of the read signal RS is detected by the amplitude detecting circuit 5, thereby generating an amplitude detection signal AS. The low-pass filter 6 cuts off a high-frequency component of this amplitude detection signal AS. The reason for this is that a DC level abruptly fluctuates due to the thermal asperity, and the amplitude detecting circuit 5 follows up this fluctuation, in which case there might be a possibility in which a rise of the thermal asperity can not be detected.

A contrivance against the above-mentioned is that, as indicated by a low-pass filter output BS in FIG. 2, the low-pass filter 6 cuts off a high-frequency component of an output AS of the amplitude detecting circuit 5, and the slice level is unable to follow up the abrupt fluctuation of the DC level of the read signal RS. With this contrivance, it is feasible to restrain the slice level from following up the fluctuation of the read signal and an occurrence of a malfunction down to the minimum.

This low-pass filter output BS is amplified into m-fold output (m>1) by the amplifier circuit 7, thereby creating the slice level SL. The comparing circuit 8 compares the input signal RS with the slice level SL and, when the input signal RS exceeds the slice level SL, generates the thermal asperity detection signal TAF.

Figure 12:
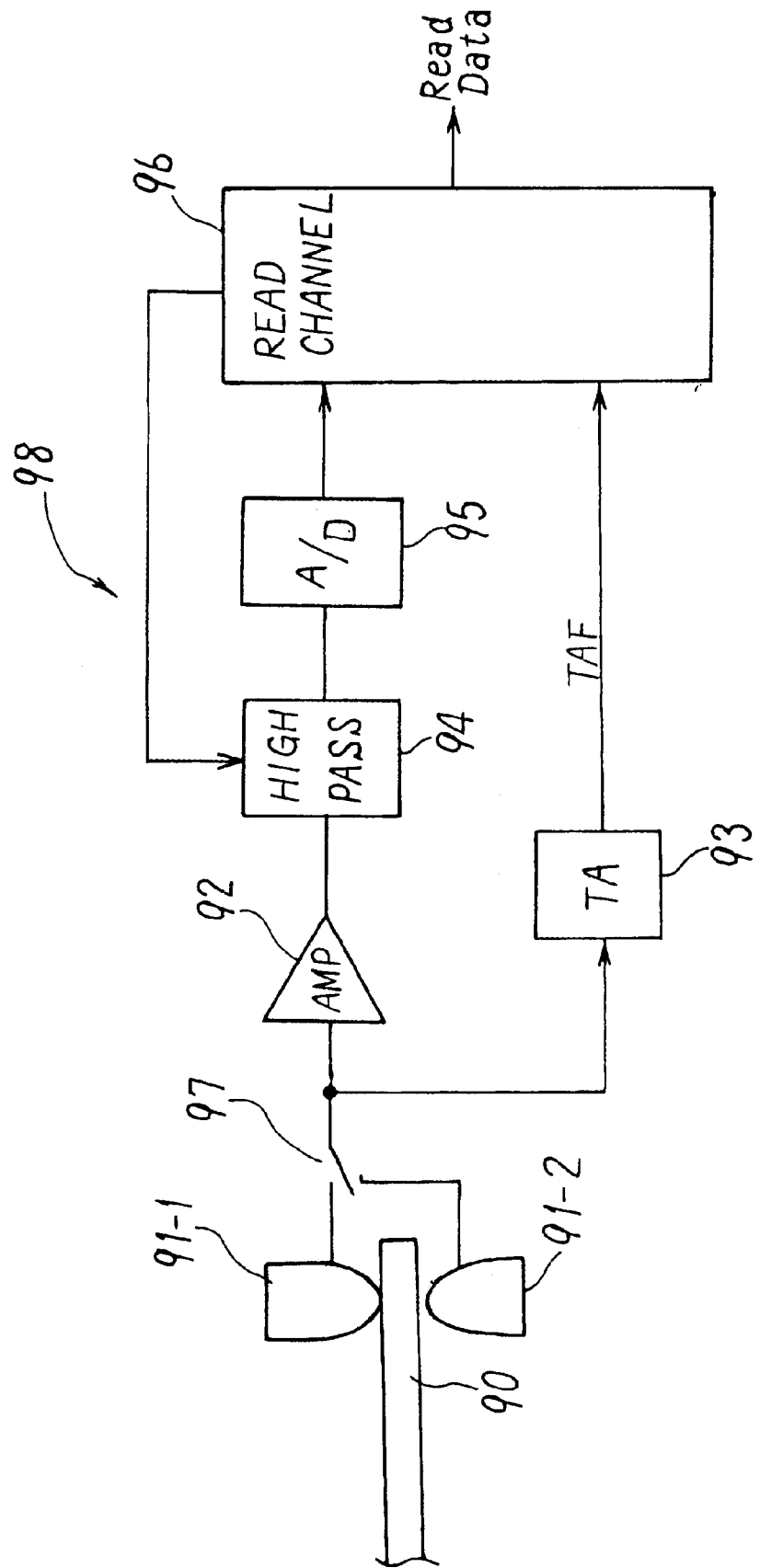
FIG. 12 is a diagram showing a construction of a read circuit in the prior art.
Figure 13:
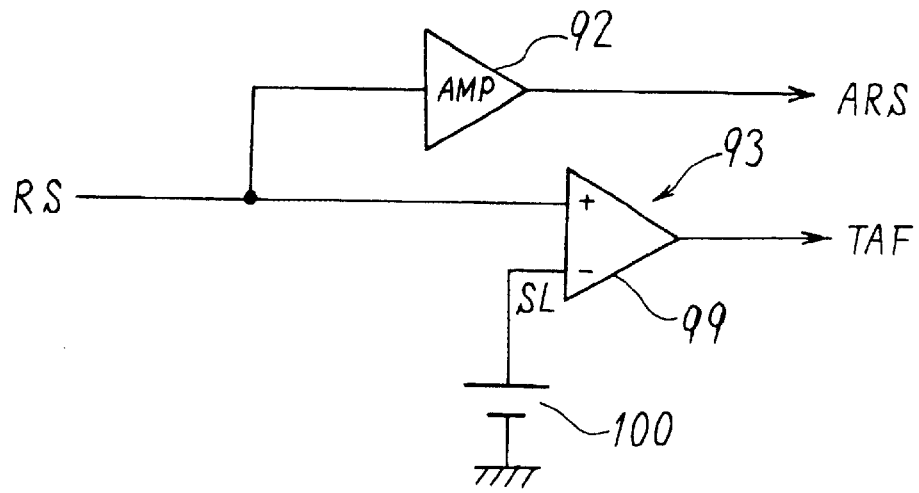
FIG. 13 is a diagram showing a construction of a TA detecting circuit in the prior art.
Figure 14:
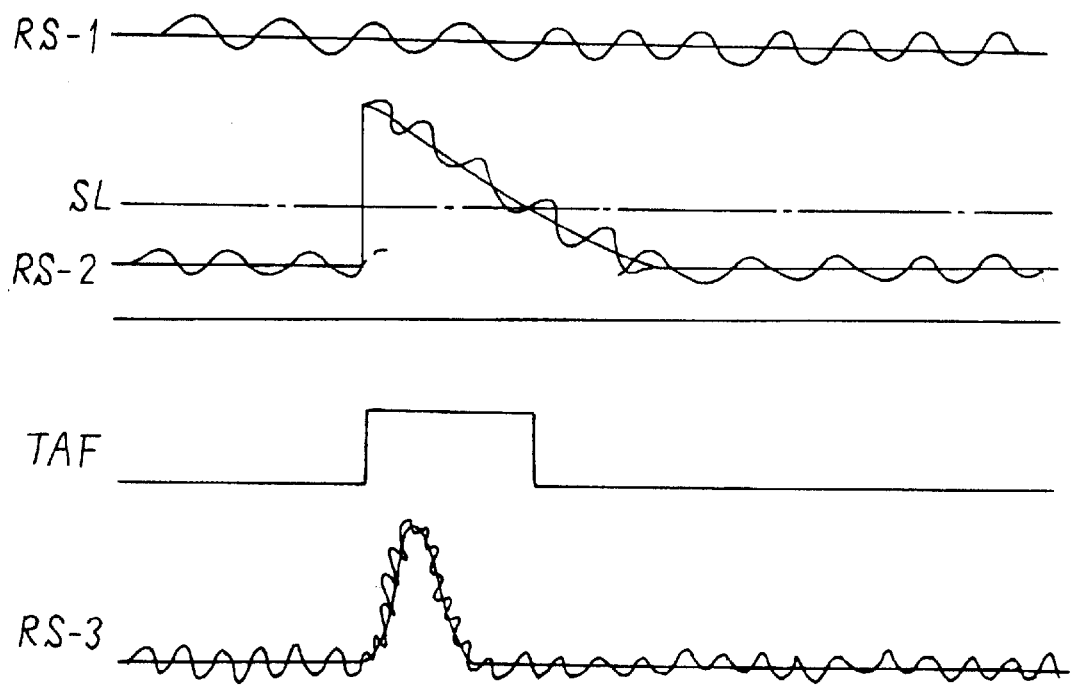
FIG. 14 is a diagram showing waveforms in the prior art.

This thermal asperity detection signal TAF is inputted to a read channel 96 (see FIG. 12). The read channel circuit 96, as discussed above, executes the process of correcting the baseline of the read signal. For instance, the read channel circuit 96, upon receiving the thermal asperity detection signal TAF, executes a read retry process, i.e., re-reads the data on the track concerned.

Then, when in the read retry process, the read channel circuit 96 operates the high-pass filter 94 to cut off the low-frequency component of the read signal RS. A time (a length) of the segment with the changed baseline can be thereby reduced. The segment with the changed baseline is small, and therefore, even if the data on this segment is judged to be abnormal, this can be saved by an error correction at a posterior stage.

Further, in this embodiment, the detection signal TAF can be generated at a point of time when the read signal rises due to the thermal asperity, so that the high-pass filter can be immediately operated without effecting the read retry process.

Thus, the amplitude of the read signal of the magnetic resistance element is detected, and the m-fold slice level is created, whereby the slice level as a relative value to the read signal level of each magnetic resistance element can be created. Therefore, the optimal slice level corresponding to the output level of the magnetic resistance element can be automatically created. Accordingly, even when the output levels of the magnetic resistance elements become different, the thermal asperity can be precisely detected.

Furthermore, since the low-pass filter 6 cuts off the high-frequency component, the slice level can be prevented from following up the abrupt fluctuation of the DC level of the read signal. This makes it feasible to restrain the slice level from following up the fluctuation of the read signal and the occurrence of the malfunction down to the minimum.

Figure 3:
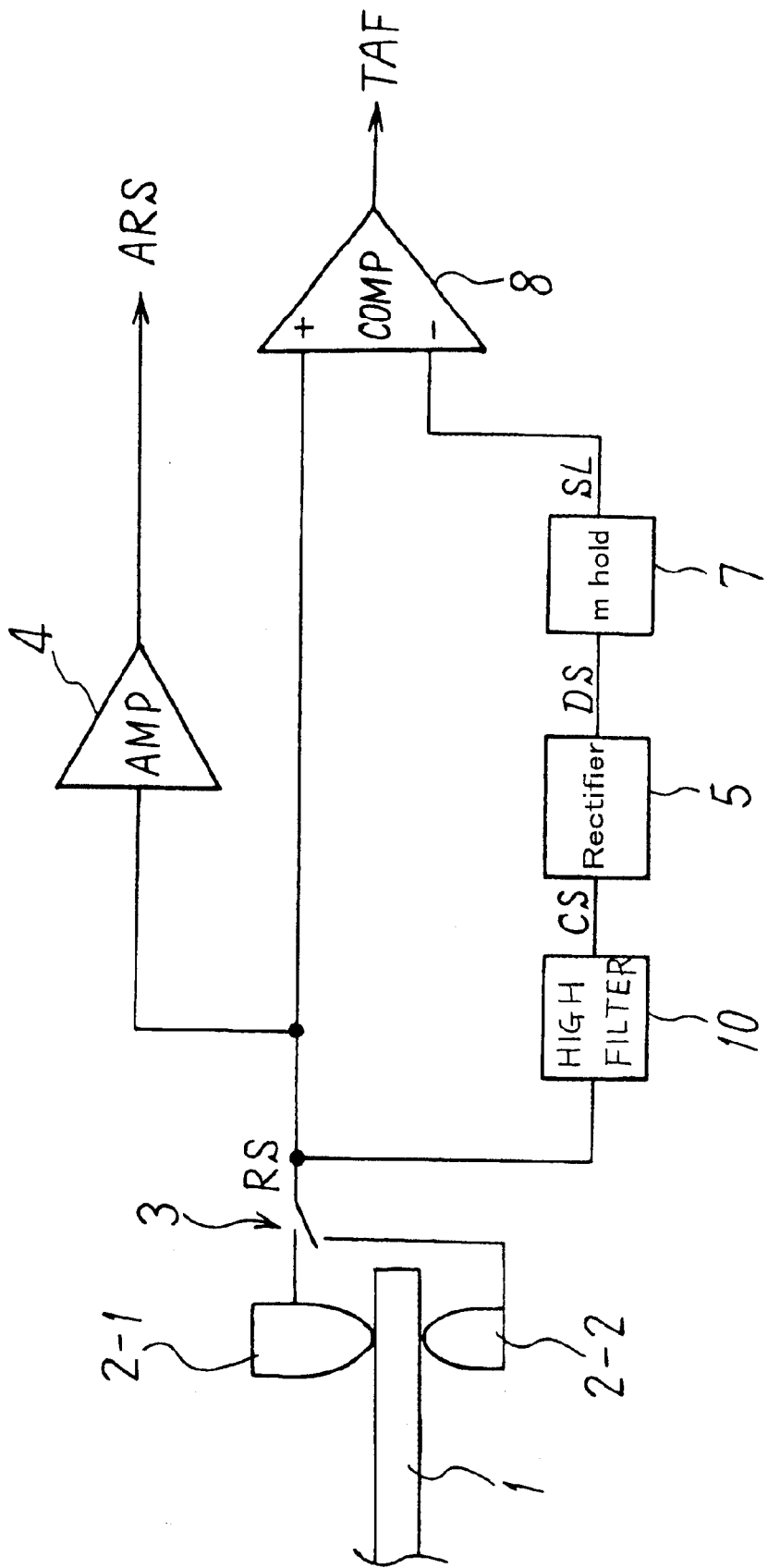
FIG. 3 is a diagram showing a circuit in a second embodiment of the present invention.
Figure 4:
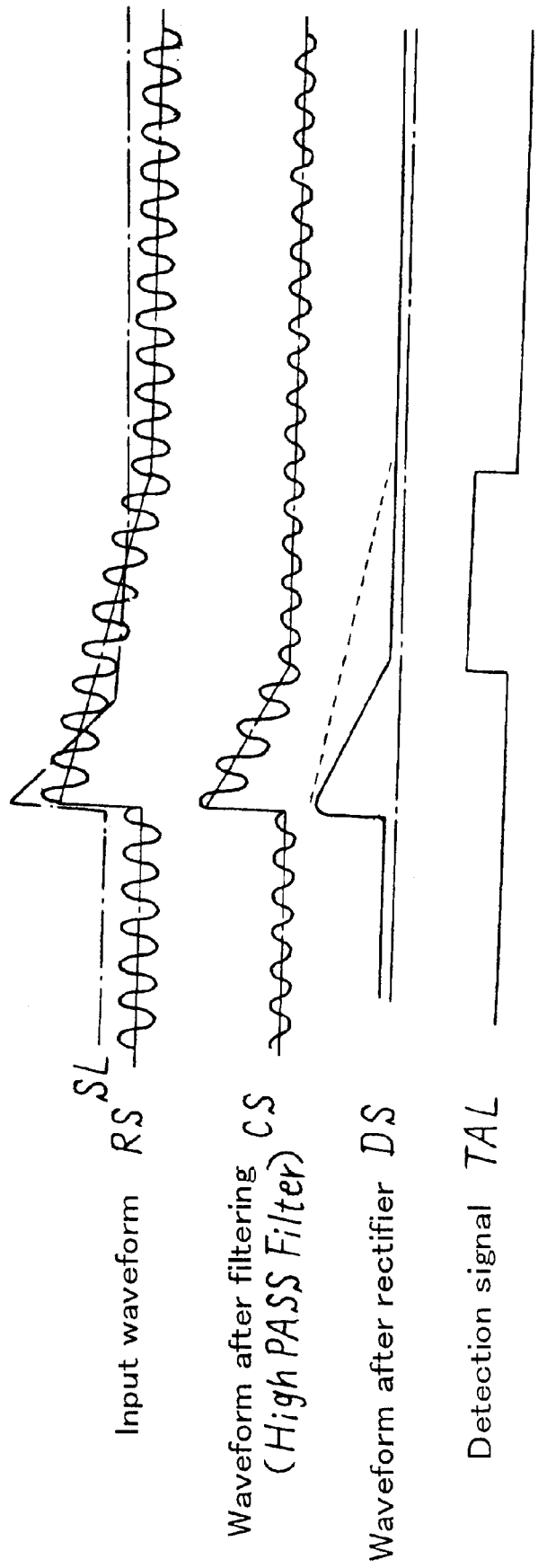
FIG. 4 is a diagram showing waveforms in the second embodiment of the present invention.

FIG. 3 is a diagram showing a circuit in a second embodiment of the present invention. FIG. 4 is a diagram showing waveforms based on the construction in FIG. 3.

Referring to FIG. 3, the same components as those illustrated in FIG. 1 are marked with the like reference numerals. The high-pass filter 10 is provided at an anterior stage to the amplitude detecting circuit 5, and cuts off the low-frequency component of the read signal RS.

An operation of this circuit is explained. The high-pass filter 10 cuts off the low-frequency component of the read signal RS. The reason for this is that the DC Level abruptly fluctuates due to the thermal asperity, and the amplitude detecting circuit 5 follows up this fluctuation, in which case there might be a possibility in which the fluctuation of the read signal due to the thermal asperity can not be detected.

A contrivance against the above-mentioned is that, as indicated by a high-pass filter output CS in FIG. 4, the high-pass filter 10 cuts off a low-frequency component having no influence upon the signal amplitude level. With this contrivance, it is possible to restrain the slice level from following up the fluctuation of the read signal and the occurrence of the malfunction down to the minimum.

An amplitude of this output CS of the high-pass filter 10 is detected by the amplitude detecting circuit 5, and an amplitude detection signal DS is generated. This amplitude detection signal DS is amplified into an m-fold output (m>1) by the amplifier circuit 7, thereby creating the slice level SL. The comparing circuit 8 compares the input signal RS with the slice level SL and, when the input signal RS exceeds the slice level SL, generates the thermal asperity detection signal TAF.

This thermal asperity detection signal TAF is, as in the example shown in FIG. 1, inputted to the read channel 96 (see FIG. 12). The read channel circuit 96, as discussed above, executes the process of correcting the baseline of the read signal. For instance, the read channel circuit 96, upon receiving the thermal asperity detection signal TAF, executes the read retry process, i.e., re-reads the data on the track concerned.

Then, when in the read retry process, the read channel circuit 96 operates the high-pass filter 94 to cut off the low-frequency component of the read signal RS. A time (a length) of the segment with the changed baseline can be thereby reduced. Thus, the amplitude of the read signal of the magnetic resistance element is detected, and the m-fold slice level is created, whereby the slice level as a relative value to the read signal level of each magnetic resistance element can be created. Therefore, the optimal slice level corresponding to the output level of the magnetic resistance element can be automatically created. Accordingly, even when the output levels of the magnetic resistance elements become different, the thermal asperity can be precisely detected.

Furthermore, since the high-pass filter 10 cuts off the low-frequency component, the slice level can be prevented from following up the fluctuation of the DC level of the read signal RS. This makes it feasible to restrain the slice level from following up the fluctuation of the read signal and the occurrence of the malfunction down to the minimum.

Figure 5:
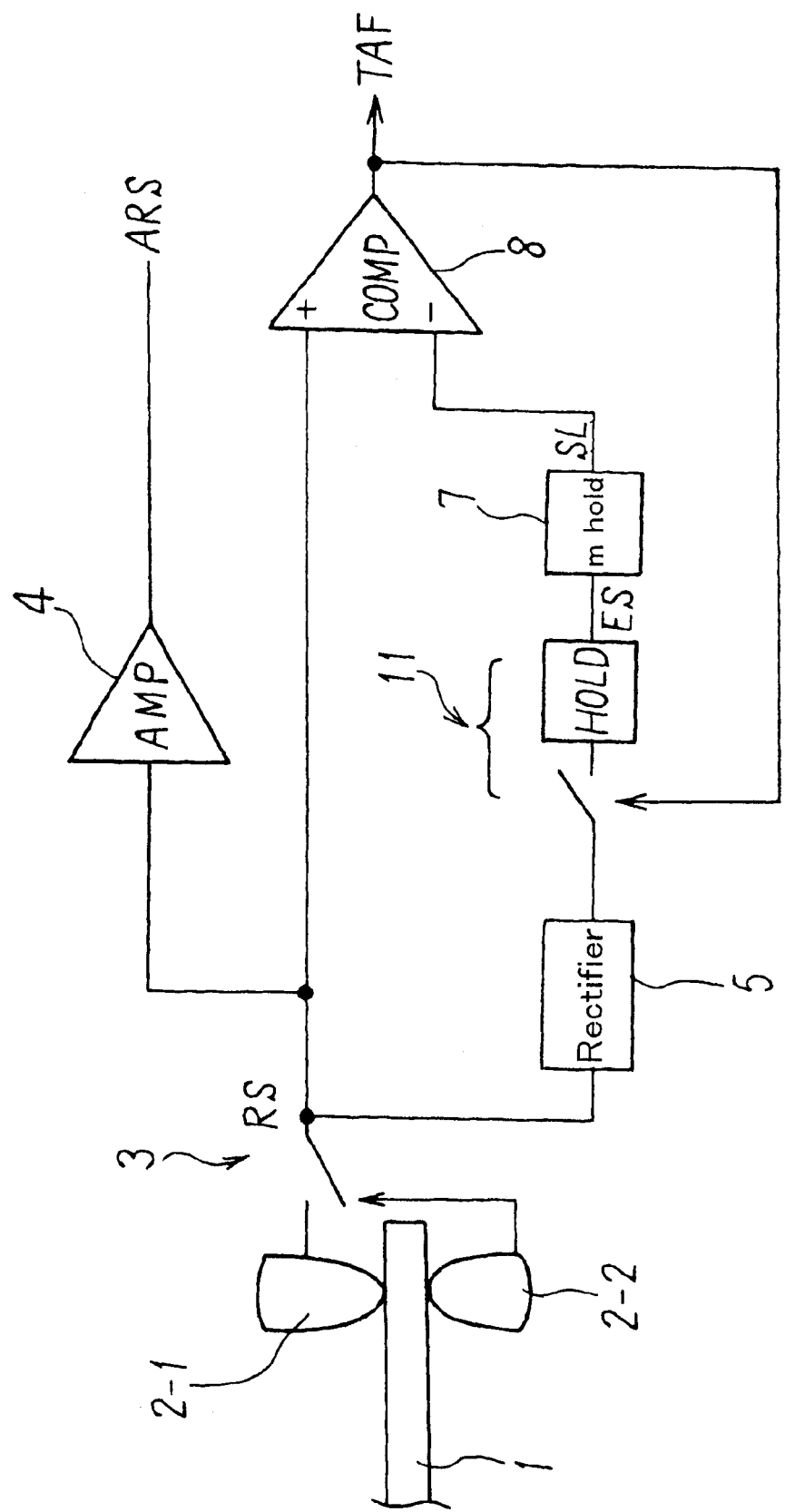
FIG. 5 is a diagram showing a circuit in a third embodiment of the present invention.
Figure 6:
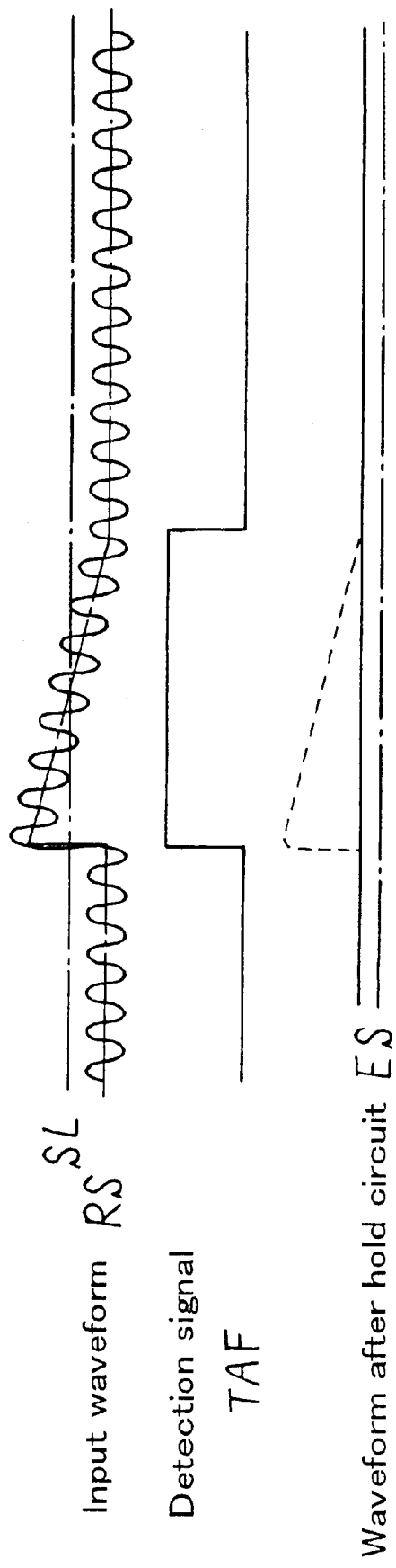
FIG. 6 is a diagram showing waveforms in the third embodiment of the present invention.

FIG. 5 is a diagram showing a circuit in a third embodiment of the present invention. FIG. 6 is a diagram showing waveforms based on the construction in FIG. 5.

Referring to FIG. 5, the same components as those illustrated in FIGS. 1 and 3 are marked with the like reference numerals. A hold circuit 11 holds an amplitude detection level of the amplitude detecting circuit 5 in accordance with the thermal asperity detection signal TAF.

An operation of this circuit is described. The amplitude detecting circuit 5 detects an amplitude of the read signal RS, and an amplitude detection signal AS is generated. A level of this amplitude detection signal AS is, when the thermal asperity detection signal TAF is generated, held by the hold circuit 11 constructed for holding the level thereof.

The reason for this is that the DC level abruptly fluctuates due to the thermal asperity, and the amplitude detecting circuit 5 follows up this fluctuation, in which case there might be a possibility wherein the rise of the thermal asperity can not be detected.

A contrivance against the above-mentioned is that, as indicated by a hold output ES in FIG. 6, the hold circuit 11 holds a level of the output AS (see FIG. 2) of the amplitude detecting circuit 5, and, even when a time constant of the fluctuation of the DC level of the read signal RS is large, the slice level does not follow up the fluctuation thereof. With this contrivance, it is feasible to restrain the slice level from following up the fluctuation of the read signal and the occurrence of the malfunction down to the minimum.

This hold output ES is amplified into an m-fold output (m>1) by the amplifier circuit 7, thereby creating the slice level SL. The comparing circuit 8 compares the input signal RS with the slice level SL and, when the input signal RS exceeds the slice level SL, generates the thermal asperity detection signal TAF.

This thermal asperity detection signal TAF is inputted to the read channel 96 (see FIG. 12). The read channel circuit 96, as described above, executes the process of correcting the baseline of the read signal. For instance, the read channel circuit 96, upon receiving the thermal asperity detection signal TAF, executes the read retry process, i.e., re-reads the data on the track concerned.

Then, when in the read retry process, the read channel circuit 96 operates the high-pass filter 94 to cut off the low-frequency component of the read signal RS. A time (a length) of the segment with the changed baseline is thereby reduced. The segment with the changed baseline is small, and therefore, even if the data on this segment is judged to be abnormal, this can be saved by an error correction at a posterior stage.

Further, in this embodiment, the detection signal TAF can be generated at a point of time when the read signal rises due to the thermal asperity, so that the high-pass filter can be immediately operated without effecting the read try process.

Thus, the amplitude of the read signal of the magnetic resistance element is detected, and the m-fold slice level is created, whereby the slice level as a relative value to the read signal level of each magnetic resistance element can be created. Therefore, the optimal slice level corresponding to the output level of the magnetic resistance element can be automatically created. Accordingly, even when the output levels of the magnetic resistance elements become different, the thermal asperity can be precisely detected.

Further, the hold circuit 11 holds the level when detected, thereby making it feasible to prevent the slice level from following up the abrupt fluctuation of the DC level of the read signal RS. This makes it possible to restrain the slice level from following up the fluctuation of the read signal and the occurrence of the malfunction down to the minimum.

Figure 7:
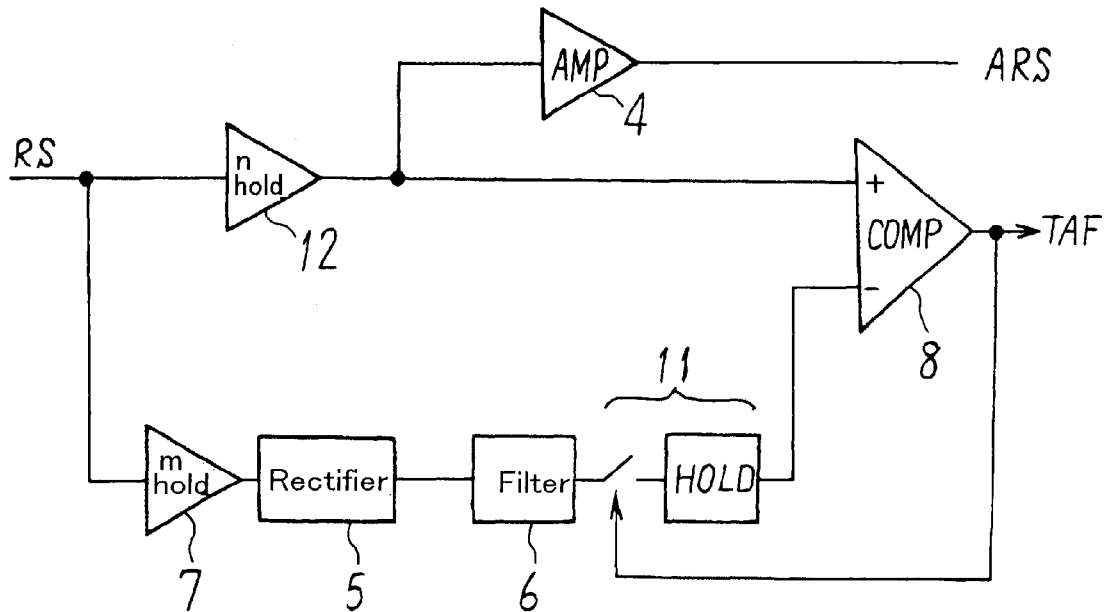
FIG. 7 is a diagram showing a circuit in a fourth embodiment of the present invention.

FIG. 7 is a diagram showing a circuit in a fourth embodiment of the present invention.

Referring to FIG. 7, the same components as those illustrated in FIGS. 1, 3 and 5 are marked with the like reference numerals. In the fourth embodiment, the read signal RS is multiplied by "n" (n<m) by an amplifier 12 and then inputted to the comparing circuit 8. Then, the amplifier circuit 7 is provided at an anterior stage to the amplitude detecting circuit 5, and the read signal RS is multiplied by "m" (m>1). Further, the low-pass filter 6 described in the first embodiment is provided at the posterior stage to the amplitude detecting circuit 5, and the hold circuit 11 described in the third embodiment is provided at the posterior stage to the low-pass filter 6.

In the fourth embodiment, as explained in the first embodiment, the low-pass filter 6 cuts off the high-frequency component of the amplitude detection output of the amplitude detecting circuit 5, and, as discussed in the third embodiment, the hold circuit holds the level when detected.

Therefore, as explained in the first embodiment, the slice level can be prevented from following up the fluctuation of the read signal, and besides, as discussed in the third embodiment, even if the time constant of the fluctuation is large, it is feasible to prevent the slice level from following up the fluctuation of the read signal.

Figure 8:
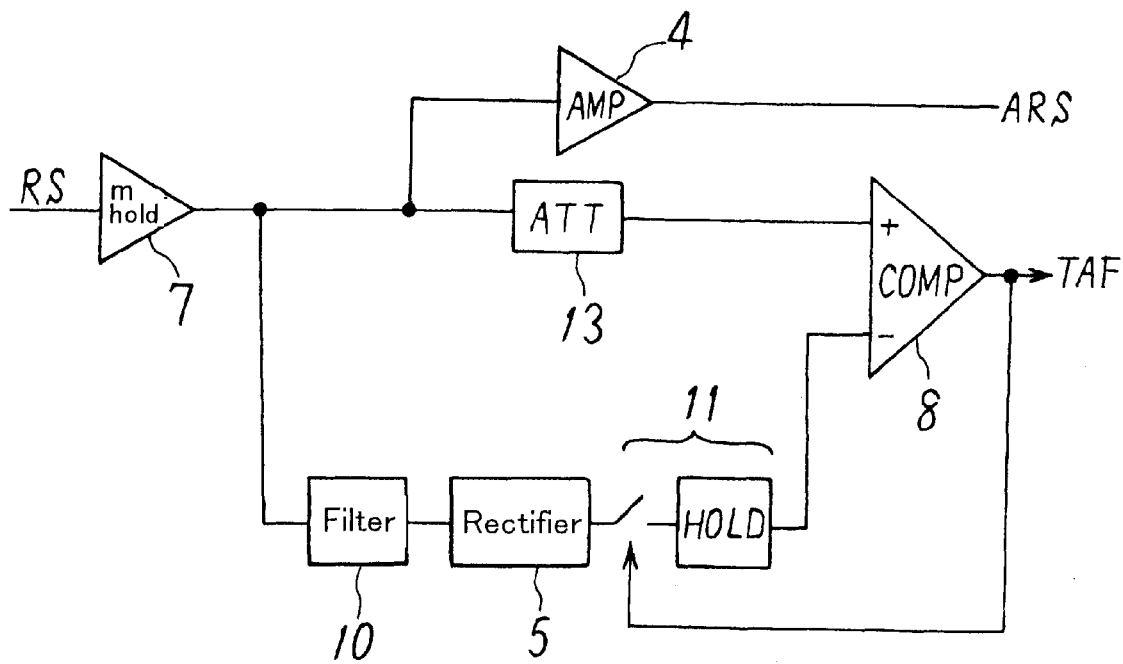
FIG. 8 is a diagram showing a circuit in a fifth embodiment of the present invention.

FIG. 8 is a diagram showing a circuit in a fifth embodiment of the present invention.

Referring to FIG. 8, the same components as those shown in FIGS. 1, 3 and 5 are marked with the like reference symbols. In the fifth embodiment, the read signal RS is multiplied by "m" (m>1) by the amplifier circuit 7, and thereafter a level of an input of the comparing circuit 8 is attenuated by an attenuator 13. Further, the high-pass filter 10 explained in the second embodiment is provided at the anterior stage to the amplitude detecting circuit 5, and the hold circuit 11 described in the third embodiment is provided at the posterior to the amplitude detecting circuit 5.

In the fifth embodiment, as discussed in the second embodiment, the high-pass filter 10 cuts off the low-frequency component of the read signal RS, and, as described in the third embodiment, the hold circuit holds the level when detected.

Hence, as explained in the second embodiment, the slice level can be prevented from following up the fluctuation of the read signal, and besides, as discussed in the third embodiment, even if the time constant of the fluctuation is large, it is possible to prevent the slice level from following up the fluctuation of the read signal.

Figure 9:
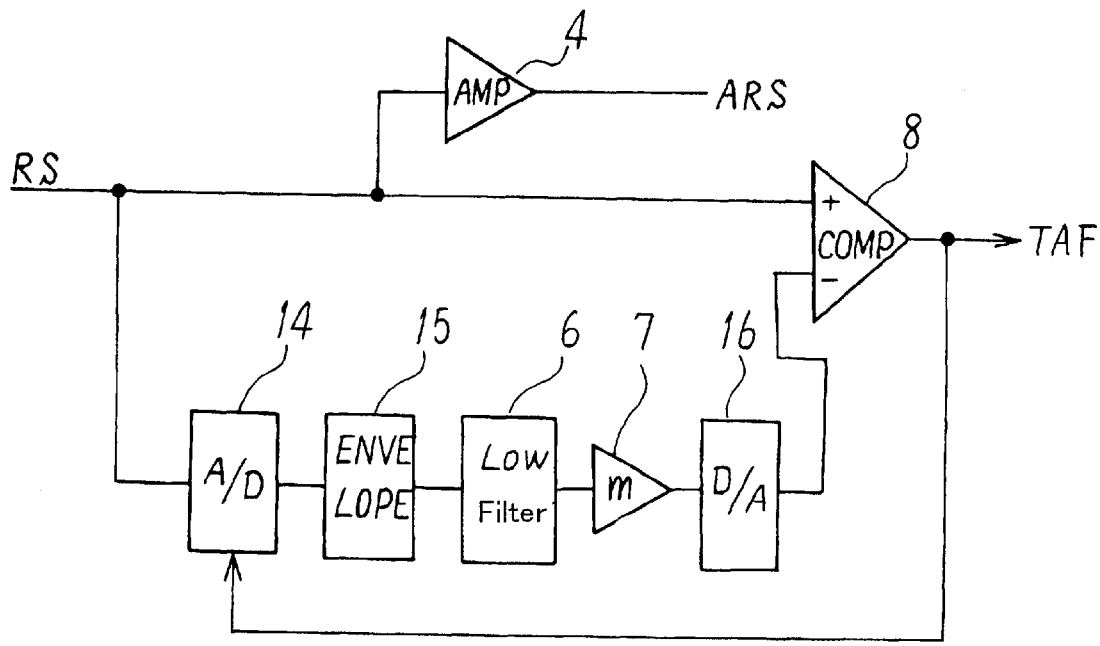
FIG. 9 is a diagram showing a circuit in a sixth embodiment of the present invention.

FIG. 9 is a diagram showing a circuit in a sixth embodiment of the present invention.

Referring to FIG. 9, the same components as those shown in FIGS. 1, 3 and 5 are marked with the like reference numerals. In the sixth embodiment, the amplitude detecting circuit in FIG. 1 is constructed of a digital processing circuit. To be more specific, the amplitude detecting circuit is constructed of an analog/digital converter 14 for converting an analog read signal into a digital value, and an envelope arithmetic unit 15 for calculating an envelope of a waveform. Further, the low-pass filter 6 is constructed of a digital low-pass filter. Furthermore, the digital/analog converter 16 converts a digital low-pass filter output into an analog slice level SL.

The sixth embodiment, in which the thermal asperity detecting circuit is constructed of a digital circuit, exhibits the same operation and effect as those in the first embodiment. Moreover, the analog/digital converter 14 is controlled by the thermal asperity detection signal TAF, and therefore performs a function of the hold circuit shown in the third embodiment.

Figure 10:
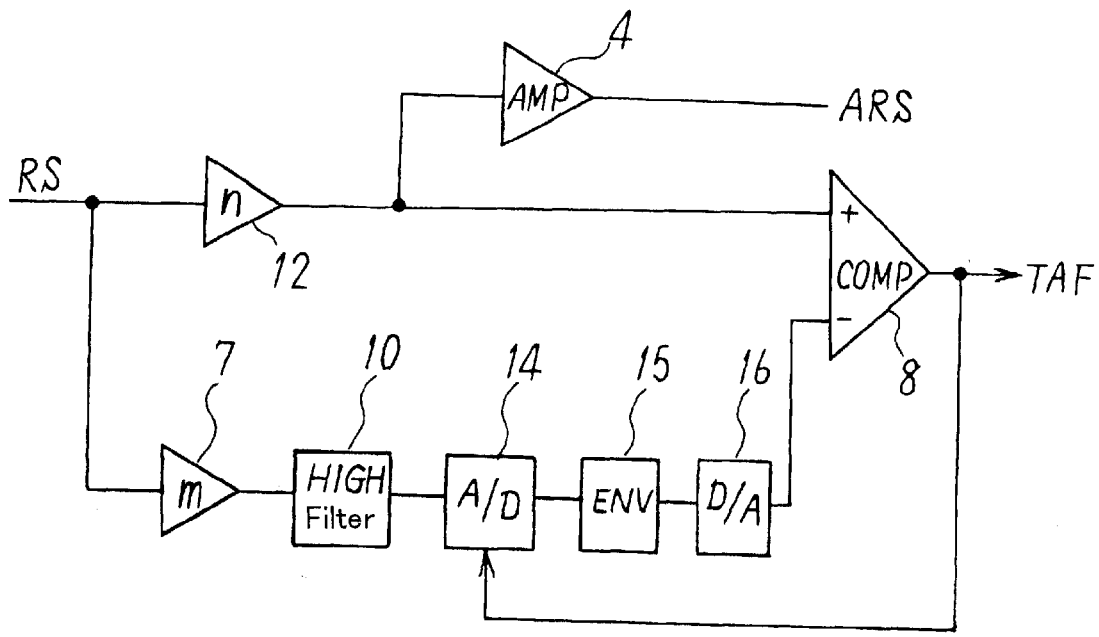
FIG. 10 is a diagram showing a circuit in a seventh embodiment of the present invention.

FIG. 10 is a diagram showing a circuit in a seventh embodiment of the present invention.

Referring to FIG. 10, the same components as those shown in FIGS. 1, 3 and 7 are marked with the like reference numerals. In the seventh embodiment, the amplitude detecting circuit in FIG. 3 is constructed of a digital processing circuit. To be more specific, the amplitude detecting circuit is constructed of the analog/digital converter 14 for converting an analog high-pass filter output into a digital value, and the envelope arithmetic unit 15 for calculating the envelope of the waveform. The digital/analog converter 16 converts a digital envelope arithmetic output into the analog slice level SL.

The seventh embodiment, in which the thermal asperity detecting circuit is constructed of the digital circuit, exhibits the same operation and effect as those in the second embodiment. Moreover, the analog/digital converter 14 is controlled by the thermal asperity detection signal TAF, and therefore performs the function of the hold circuit shown in the third embodiment.

Figure 11:
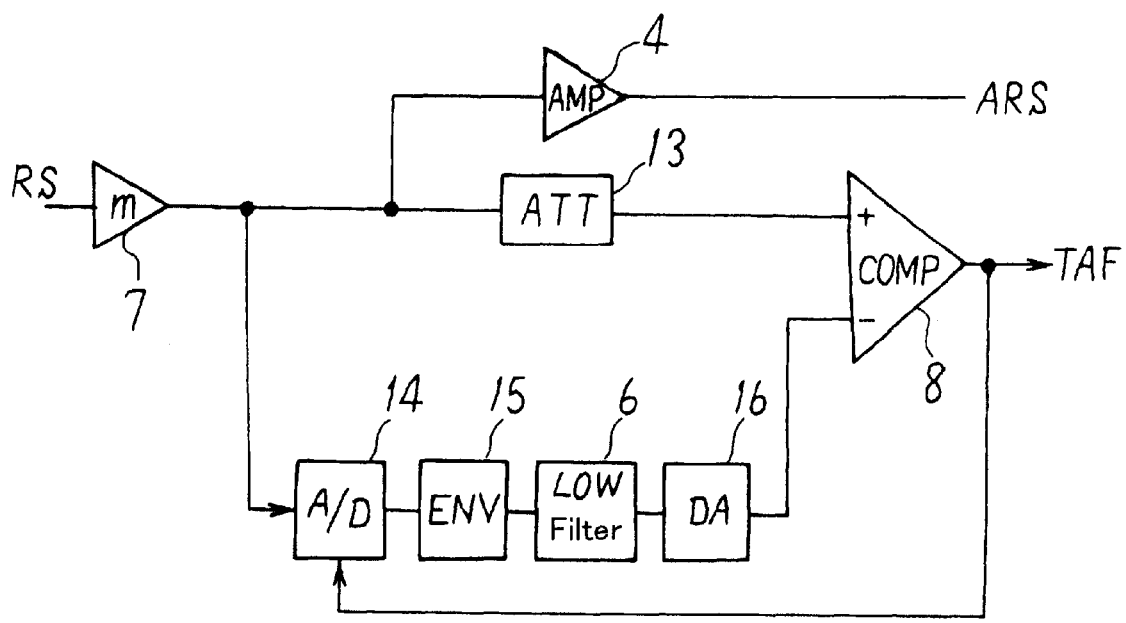
FIG. 11 is a diagram showing a circuit in an eighth embodiment of the present invention.

FIG. 11 is a diagram showing a circuit in an eighth embodiment of the present invention.

Referring to FIG. 11, the same components as those shown in FIGS. 1, 7 and 9 are marked with the like reference numerals. In the eighth embodiment, the amplitude detecting circuit in FIG. 1 is constructed of the digital processing circuit. To be more specific, the amplitude detecting circuit is constructed of the analog/digital converter 14 for converting the analog read signal into the digital value, and the envelope arithmetic unit 15 for calculating the envelope of the waveform. Further, the low-pass filter 6 is constructed of the digital low-pass filter. Furthermore, the digital/analog converter 16 converts the digital low-pass filter output into the analog slice level SL.

Further, the read signal RS is multiplied by "m" (m>1) by the amplifier circuit 7. Then, a level of an output of the amplifier circuit 7 is attenuated by the attenuator 13, and thereafter inputted to the comparing circuit 8. Moreover, the output of the amplifier circuit 7 is inputted to the analog/digital converter 14.

The eighth embodiment, in which the thermal asperity detecting circuit is constructed of the digital circuit, exhibits the same operations and effects as those in the first and sixth embodiments. Moreover, the analog/digital converter 14 is controlled by the thermal asperity detection signal TAF, and therefore performs the function of the hold circuit shown in the third embodiment.

In addition to the embodiments discussed above, the present invention can be modified as follows.

(1) The magnetic disk device has been exemplified as a magnetic storage device, however, the present invention can be applied to other magnetic storage devices such as a magnetic card device and a magnetic data device etc.

(2) It is also possible to construct a thermal asperity detecting circuit into which the low-pass filter, the high-pass filter and the hold circuit are properly combined.

The present invention has been discussed by way of the embodiments, but can be modified in a variety of forms within the gist of the present invention, and those modifications are not excluded from the scope of the present invention.

As discussed above, the present invention exhibits the effects which follow.

(1) The slice level of the output relative value is created based on the output of the magnetic resistance element, and hence the slice level having a magnitude corresponding to the output level of each magnetic resistance element can be automatically created. Therefore, the slice level corresponding to the characteristic of each of the magnetic resistance elements can be automatically created, so that the thermal asperity of each magnetic resistance element can be precisely detected.

(2) The characteristic of each magnetic resistance element can be actualized without measuring it, and hence a labor for the measurement can be omitted.

(3) The control of setting the slice level when selecting the head is not required, and therefore a burden on the firmware can be relieved.

What is claimed is:

1. A method of detecting a thermal asperity of a magnetic storage device for reading data from a magnetic storage medium by use of a magnetic resistance element, comprising:

a first step of detecting an amplitude of an output of said magnetic resistance element, and creating a variable slice level which has an m-times (m>1) magnitude as large as a level of said detected amplitude from said output; and a second step of comparing an output signal of said magnetic resistance element with said created slice level, and generating a thermal asperity detection signal.

2. A method of detecting a thermal asperity of a magnetic storage device according to claim 1, wherein said first step includes a step of multiplying the level of the output of said magnetic resistance element by "m" (m>1).

3. A method of detecting a thermal asperity of a magnetic storage device according to claim 1, wherein said first step includes a step of cutting off a predetermined frequency component of the output of said magnetic resistance element.

4. A method of detecting a thermal asperity of a magnetic storage device according to claim 3, wherein said cutting step comprises a step of cutting off a low frequency component of the output of said magnetic resistance element.

5. A method of detecting a thermal asperity of a magnetic storage device according to claim 3, wherein said cutting step comprises a step of cutting off a high frequency component of the output of said magnetic resistance element.

6. A method of detecting a thermal asperity of a magnetic storage device according to claim 1, wherein said first step includes a step of holding the output level of said magnetic resistance element in accordance with the thermal asperity detection signal.

7. A circuit for detecting a thermal asperity of a magnetic storage device for reading data from a magnetic storage medium by use of a magnetic resistance element, comprising:

a slice level creating circuit for detecting an amplitude of an output of said magnetic resistance element, and creating a variable slice level which has an m-times (m>1) magnitude as large as a level of said detected amplitude from said output; and a comparing circuit for comparing an output signal of said magnetic resistance element with said created slice level, and generating a thermal asperity detection signal.

8. A circuit for detecting a thermal asperity of a magnetic storage device according to claim 7, wherein said slice level creating circuit includes an amplitude detecting circuit for detecting an amplitude of the output of said magnetic resistance element.

9. A circuit for detecting a thermal asperity of a magnetic storage device according to claim 7, wherein said slice level creating circuit includes an amplifier circuit for multiplying the output level of said magnetic resistance element by "m" (m>1).

10. A circuit for detecting a thermal asperity of a magnetic storage device according to claim 7, wherein said slice level creating circuit includes a filter for cutting off a predetermined frequency component of the output of said magnetic resistance element.

11. A circuit for detecting a thermal asperity of a magnetic storage device according to claim 10, wherein said filter comprises a high-pass filter for cutting off a low frequency component of the output of said magnetic resistance element.

12. A circuit for detecting a thermal asperity of a magnetic storage device according to claim 10, wherein said filter comprises a low-pass filter for cutting off a high frequency component of the output of said magnetic resistance element.

13. A circuit for detecting a thermal asperity of a magnetic storage device according to claim 10, wherein said slice level detecting circuit includes a hold circuit for holding the output level of said magnetic resistance element.

14. A storage device comprising:

a magnetic head for at least reading data from a magnetic storage medium;

a thermal asperity detector comprising:

a slice level creating circuit for detecting an amplitude of an output of said magnetic head, and creating a variable slice level which has an m-times (m>1) magnitude as large as a level of said detected amplitude from said magnetic head output; and a comparing circuit for comparing an output signal of said magnetic head with said created slice level, and generating a thermal asperity detection signal.

15. The storage device according to claim 14, further comprising a read channel for outputting a read data from said output of said magnetic head.

16. The storage device according to claim 14, wherein said magnetic head comprises a magnetic resistance element.

* * * * *